United States Patent [19]

Wadlington, Jr.

[11] Patent Number: 5,486,809
[45] Date of Patent: Jan. 23, 1996

[54] LEVER-TAP-ACTIVATED TIMED TURN SIGNALING

[76] Inventor: Ben Wadlington, Jr., Rt. 2, Box 913-A, Adkins, Tex. 78101

[21] Appl. No.: 254,518

[22] Filed: Jun. 6, 1994

[51] Int. Cl.$^6$ ............................................. B60Q 1/40
[52] U.S. Cl. ................ 340/477; 200/61.27; 200/61.30; 340/475; 340/476
[58] Field of Search ............................ 340/475, 476, 340/477; 200/61.27, 61.30, 61.54

[56] References Cited

U.S. PATENT DOCUMENTS

| | | | |
|---|---|---|---|
| 3,308,428 | 3/1967 | Grontkowski | 340/477 |
| 4,348,655 | 9/1982 | Goertler et al. | 340/475 |
| 4,431,984 | 2/1984 | Bileck | 340/475 |
| 4,684,918 | 8/1987 | Solomon | 200/61.27 |
| 5,051,721 | 9/1991 | Harrison | 340/475 |
| 5,260,685 | 11/1993 | Parker | 340/476 |

FOREIGN PATENT DOCUMENTS

| | | | |
|---|---|---|---|
| 2084413 | 4/1982 | United Kingdom | 340/477 |
| 2104738 | 3/1983 | United Kingdom | 340/477 |

*Primary Examiner*—Brent A. Swarthout
*Attorney, Agent, or Firm*—Gunn, Lee & Miller

[57] ABSTRACT

Individual/driver-defined durations of lever-off automotive turn signaling are provided in response to the application of one or more "taps" to a vehicle's signal lever. A counter is incremented for each tap detected by monitoring circuitry. A non-zero tap count imparts the timing out of lever-off signaling. A timed-signaling duration is the sum of either one or a series of predetermined-length, tap-associated duration segments. As each segment is timed out, the tap counter is decremented. On-the-fly extensions of the duration are enabled. Reset provisions and the transparent invoking means preclude conflicts with non-timed signaling.

9 Claims, 3 Drawing Sheets

LEVER-TAP-ACTIVATED TIMED TURN SIGNALING

BACKGROUND OF THE INVENTION

1. Field of the Invention:

This invention pertains to blinking-lamp automotive turn signaling. More particularly, this invention pertains to the provision of electronically timed durations of blinking-lamp automotive turn signaling.

2. Overview of the Relevant Art:

Run-on signaling has been a commonly observed occurrence ever since blinking-lamp turn signals became popular. The misunderstandings among drivers that it causes can be both bothersome and dangerous.

Drivers who use the on-but-unlatched signal-lever positions help to reduce run-on signaling. Visible/audible feedback provisions (i.e., the blinking dashboard arrows/the clicking flasher module) and after-turn lever-unlatching arrangements also help to reduce it. However, further reductions in run-on signaling and reductions in (steering-ability-impairing) lever-on-but-unlatched signaling would be highly beneficial.

Various prior-art mechanisms have been concocted that employ electronic timing in an effort to reduce run-on signaling. Drivers activate the signaling of these prior-art mechanisms by placing the signal lever (or its functional equivalent) in a latched-on position. The mechanisms, in accordance with one or more of their preordained protocols, subsequently cancel the signaling by unlatching the signal lever (or its functional equivalent). In all but the earliest prior-art mechanisms, timing-delay protocols regulate the underlying duration-length protocol.

The preordained-protocol-guided/lever-unlatching approach of the prior art is a two-edged sword. It eliminates run-on signaling by mandating a cancellation subsequent to every activation. Unfortunately, it also produces an unacceptably high percentage of mistimed cancellations.

One or more of a very large number of variables (e.g., the length of freeway-entrance ramps) can have a substantial bearing on when a cancellation should occur. Because the prior-art mechanisms are guided by a comparatively meager array of preordained protocols, their ability to either perceive or respond appropriately to such variables is extremely limited. This limited ability—and the unacceptably high percentage of mistimed cancellations it en- genders—is reflected in the present-day/timers-and-signal-lever-latches-don't-mix state of the art for automobile and light-truck signaling systems.

Instead of attempting to unlatch signal levers before they stay latched too long, the present invention reduces run-on signaling by reducing the occasions that they become latched in the first place. It further enhances safety by also reducing the occasions that (steering-ability-impairing) lever-on-but-unlatched signaling is used. Its distinctive characteristics include:

First, that the timed signaling it provides is lever-off signaling. The present invention does not interfere with lever-on signaling and has no role in unlatching the signal lever.

Second, that it enables the driver to define the length of each individual timed duration of lever-off signaling that he/she invokes.

Third, that it enables the driver to make one or more on-the-fly (i.e., while a timing out is in progress) extensions to the length of a timed duration of lever-off signaling that he/she has invoked/defined.

Fourth, that the timed durations of lever-off signaling it provides are invocable, definable, extendable and cancelable via the application of taps (i.e., momentary on/off movements) to the signal lever.

3. Particulars of the Relevant Art:

In three prior U.S. Patents, timing is associated with the signaling process. In each of these patents a complete, stand-alone signaling system has been described; with the role of the timing being to cancel the signaling—in accordance with preordained protocols—by unlatching and/or restoring the lever and/or switch to its off position. In each of the three patented signaling systems preordained-protocol-guided cancellations are mandated.

In U.S. Pat. No. 3,308,428 to Grontkowski, signaling is actuated by pressing a latching button (either "PBR"or "PBL"). There is no signal lever. The single/preordained timer duration is delayed upon application of the vehicle's brakes. Restoration of the switch to the off position is achieved via solenoidal retraction of the button latches.

In U.S. Pat. No. 4,792,785 to Yurkio et at, the signaling system is configured to address the unique requirements of motorcycle turn signaling. The single/preordained timer duration controls signal cancellation at high speeds; evidently based on the presumption that any signal activation occuring at a high speed will be associated with a lane change. Restoration of the switch to the off position is achieved via an "electrical returning means."

In U.S. Pat. No. 5,260,685 to Parker, the signaling system is configured to address the unique requirements of 18-wheeler-type tractor-trailer trucks. The single/preordained timer duration plays a role in producing a cancellation only after the straight-ahead driving mode is resumed subsequent to a characteristic tractor-trailer-type turning maneuver (i.e., a maneuver where a right turn, for example, is begun by first steering to the left and then back to the right). Restoration of the signal lever to the off position is achieved via the de-energizing of an electromagnetic coil to retract the latch-detent pin.

Reiterating: (a) Basic timed signaling: signaling that starts when the signal lever (or its functional equivalent) is latched in the on position, continues while a single, preordained duration is timed out and is mandatorily canceled by a timer-expiration-triggered lever unlatching. (b) Grontkowski version: same as (a) except that the timing out is delayed during periods when the brakes are applied. (c) Yurkio et al version: same as (a) except that the vehicle must be traveling above a predetermined speed; otherwise, cancellation is based on turning angle and/or distance traveled. (d) Parker version: same as (a) except that the timing out does not begin until after the 18 wheeler-type/initial-opposite-direction portion of a turn has been completed and occurs only when the steering wheel is in the straight-ahead position. (e) Present-invention version: signaling that starts upon the application of one or more taps to the signal lever. The signal lever is not latched and immediately returns to the off position. Both variable/driver-determined duration lengths and on-the-fly duration extensions are enabled. Conventional signaling is supplemented; neither lever-on signaling nor the function of the signal-lever latch is affected.

|  | PRIOR ART | PRESENT INVENTION |
|---|---|---|
| ACTUATION EVENT | latching the lever | tapping the lever |
| LEVER (or equiv.) UNLATCHING | controlled by the device | independent of the device |
| TIMED-SIGNALING DURATION(S) | single; preordained | multiple; driver-determined |
| ON-THE-FLY DURATION EXTENSIONS | not enabled | enabled |
| CONVENTIONAL USE OF THE SIGNALS | superseded; timed signaling is obligatory | supplemented; timed signaling is optional |

The present invention uniquely and advantageously coexists with conventional signaling Further, it puts the driver in (user-friendly) control of the duration—as well as the occasion—of the lever-off timed signaling it provides. It is a fundamental redefinition of timer-aided signaling that overcomes the primary defect of prior/preordained-protocol-guided/timed-lever-unlatching signaling systems.

BACKGROUND OF THE INVENTION

The present invention is primarily directed toward enabling lever-off periods of driver-defined-duration timed signaling for automobiles or light trucks with signaling systems that otherwise (1) would provide signaling in response to either a "latched-on" or an "on-but-unlatched" condition (right or left) in the lever-operated turn-signal switch and (2) are operable such that a "latched-on" lever will remain so until it is either manually moved back to the unlatched side of the latching detent or an after-turn/steering-wheel-rotation-triggered unlatching occurs.

A signaling system that includes the device that is the primary embodiment of the present invention can be nearly identical to a conventional signaling system. In most conventional signaling systems, the flow of flasher-pulsed battery current to the right/(left) signal lamp(s) is effected via the right/(left) contacts of the lever-operated switch. In systems equipped with said primary-embodiment device, the flow of said current is instead effected via the right/(left) relay that is a part of the primary-embodiment device; also, a source of +5V regulated power, to be effected—both directly and via the lever-operated switch—to certain components of said device, is required. There need be no other outward differences between the two types of signaling system.

The primary embodiment of the present invention includes two electrical latches, two electrical output drivers, a timer circuit and a reset circuit. The two electrical latches and output drivers correlate to a left and right side of the signal system. The timer and reset circuits are shared between the right and left sides. When the lever switch is closed in either the left or right position, the corresponding electrical latch latches the switch closure as a logic level 1. The switch closure also activates the timing circuit. The timing circuit consists of an electrical counter and two electrical timers, one for the input and one for the output. If the switch closure is a momentary closure, i.e., lasting less than a predetermined time period (e.g., .5, 0.75 second) as established by the input timer, an audible indication is provided and the counter is incremented. This is repeated for each momentary switch closure. The presence of any count on the counter activates the output timer which turns on the output for a predetermined time period (e.g., 2, 3 seconds) as established by the output timer. This timer output, in conjunction with the electrical latch which is activated, powers the output driver to turn on the associated signal. The output drivers activate the signals by closing a relay which completes the signal circuit consisting of the vehicle battery as the power supply, the flasher and the indicator lamp(s). After the time period expires, the timer circuit decrements the counter. The output remains active until the counter is decremented to zero counts or is reset by the operator. The reset circuit is utilized to reset the input latches and timer circuit. If a timed signal is active and a momentary closure of the switch occurs in the opposite position, the active output latch, counter and output timer are deactivated, thus canceling the current timed output. This provides a means for canceling an active timed signal before completion of its set period.

If a non-momentary closure of the switch occurs, i.e., lasting more than the predetermined time period, the counter and output timers are not activated; however the associated output driver is activated to turn on the corresponding signal. This signal will remain active until the lever switch is returned to the open position.

The following instructions to a hypothetical user of the device may further explain/clarify the operating characteristics of the primary-embodiment device:

This device can provide you with variable-length periods of timed signaling that continue after the signal lever has returned to the "off" position. This is the only kind of signaling it will provide. It will neither interfere with regular/lever-on signaling nor cancel/unlatch the signal lever. Situations where its capabilities may be useful will include those where you (1) know the approximate signaling duration your intended maneuver will require and (2) do not expect the signals to be canceled subsequent to the maneuver by the after-turn lever unlatcher.

How do you get this signaling? Simple. By tapping the signal lever (down taps for left, up taps for right). A "tap" is a movement of the lever that produces a momentary (i.e., about a half second or less) "on" condition in the lever-operated switch. Tap once for about two seconds of signaling. Tap more times and you will get two additional seconds of signaling for each additional tap.

How will you know if you have applied a tap that the device recognizes as momentary? Each time a momentary tap is detected you will hear a short sound like a "buzz" or "chirp."

What if you prefer not to use the timed signaling? No problem. If you operate your signals in the ordinary way you will never know the timed-signaling capability exists.

What happens if your timed signaling has run for a while and then you decide you need to extend it? Tap some more. Taps are detected both when timed signaling is occuring and when it isn't. More taps during timed signaling add to the length of the timed signaling.

What happens if you have tapped for timed signaling but immediately decide you don't need it? Tap once in the opposite direction. The first tap in the opposite direction resets the device. That is, it gets you back to square one.

What happens if you have tapped for right/(left) timed signaling but immediately decide you really want left/(right) timed signaling? Again, if the device is in the process of timing out right/(left) signaling, the first left/(right) tap will produce a "back-to-square-one" reset. Therefore, both left/(right) timed signaling and the tap count will commence upon the second left/(right) tap.

What happens on a reset tap during the time that the lever is momentarily in the "on" position for opposite-direction signaling? Lever-on signaling always takes precedence. Therefore, if the flasher happens to be effecting current flow when the tap occurs, that current flow will be briefly effected in the opposite-direction signaling circuitry.

What happens if you have tapped for timed signaling and then, before the timer has completed the tap-defined duration, you latch the lever on and make a turn that unlatches it? Signaling will continue until either the timer completes the tap-defined duration or you tap once in the opposite direction. This characteristic can be especially advantageous in situations where it is uncertain whether the signal lever will stay latched; particularly during maneuvers involving left-turn lanes. During such maneuvers, the after-turn unlatcher will frequently cancel left signaling before the left turn is made. This happens because the steering wheel returns almost to the straight-ahead position as the vehicle is steered to become more parallel in the turning lane. By tapping for some lever-off signaling time before you latch on the lever you can prevent an interruption of signaling that the after-turn unlatcher may otherwise produce.

The object of the invention:

To provide a user-friendly, safety-enhancing "third option" of signaling (the other two options being "on-but-unlatched" and "latched-on"). For example, a freeway-entering driver of a vehicle equipped with the present invention will have the third option of applying (one or more; depending on his/her on-the-spot evaluation of a great many variables) taps to the signal lever as he/she is accelerating on the entrance ramp. Examples of said variables include (1) the length/slope/traction/curvature/lighting of the ramp (2) the density/speed of traffic, (3) the presence/absence of rain/wind/snow/low-sun glare/dust/smoke/fog (4) the tire inflation/horsepower/transmission-type/state-of-repair of the vehicle being driven, (5) the presence/absence of a trailer under tow or a slow-moving vehicle ahead on the ramp and (6) so forth.

The apparatus will then commence delivery of the tap-defined, timed-duration period of signaling while the lever returns to the off position. One of two safety-/convenience-enhancing benefits will thereby be provided. Either the driver will be freed of the requirement to subsequently grasp the signal lever and move it back across the latching detent to the off position (a requirement of using the "latched-on" signaling mode) or the driver will be freed, during the critical moments when his/her vehicle encroaches into the through-lane traffic, of the requirement to maintain a measured degree of pressure against the signal lever with one hand while concurrently attempting to steer with the other (a requirement of using the "on-but-unlatched" signaling mode).

The driver will also benefit from having (1) defined a timed signaling duration that he/she deems suitable to the circumstances at hand and (2) the option to extend the duration if the need arises. Finally, the driver will be secure in the knowledge that the present invention will (1) stay in all respects transparent to non-timed signaling operations and (2) not join the after-turn unlatcher as a source of inappropriately mandated lever unlatching.

DETAILED DESCRIPTION OF THE PRIMARY EMBODIMENT

Figure 1:
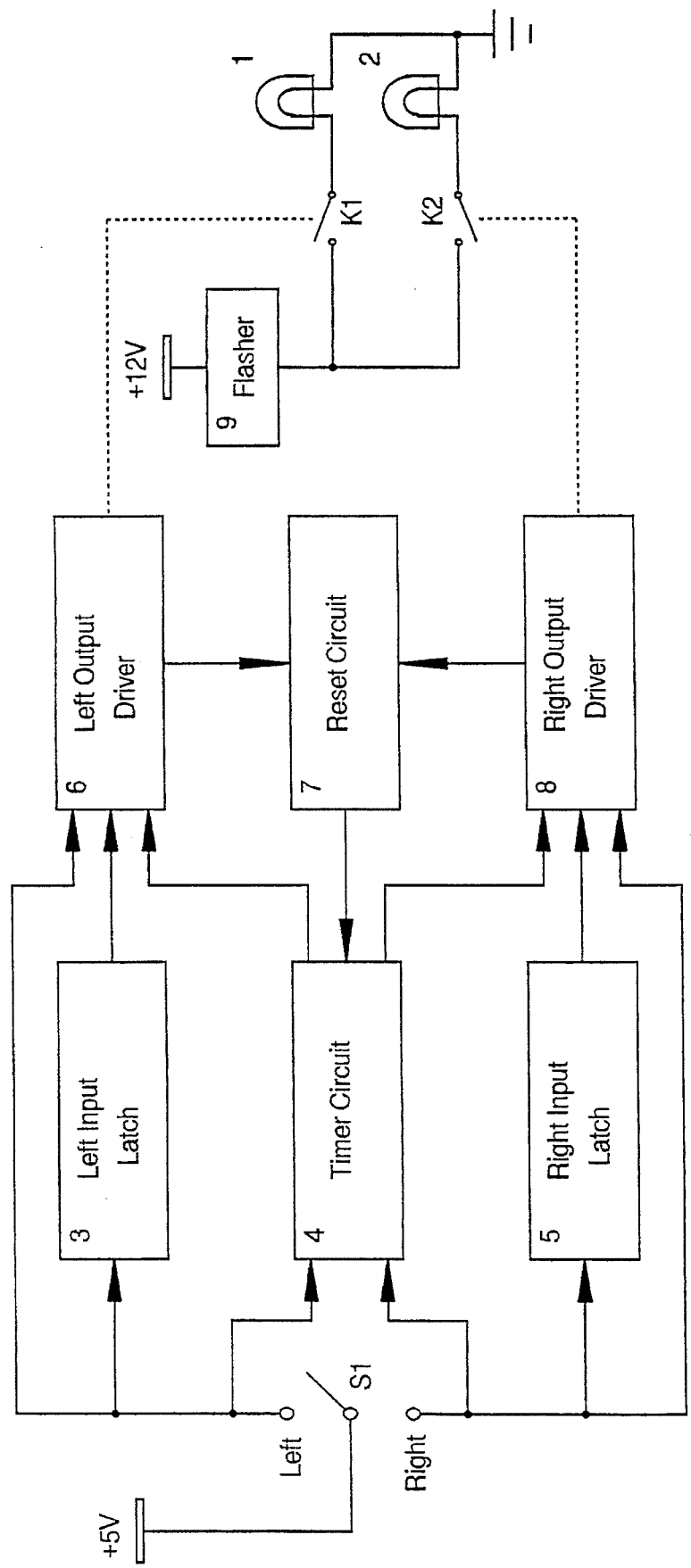
FIG. 1 is a block diagram of the primary embodiment of the present invention showing a lever switch and circuitry integrated with a signaling circuit consisting of a twelve-volt battery, flasher and signal lamps.

FIG 1 shows a signaling system with the capability of providing individual, driver-defined durations of lever-tap-activated timed turn signaling; said system consisting of a signal-lever switch connected to a +5V regulated power supply and logic circuitry which drives relays to close contacts K1 and K2 which complete a turn signal circuit consisting of a 12V power supply (battery), signal flasher 9, and turn indicator lamps 1 and 2. Lever switch S1 is used to initiate either a left or right turn indication. If the switch is placed in the left position, left input latch 3 is activated. If the switch is placed in the right position, right input latch 5 is activated. If the switch is placed in either position, the timer circuit 4 is activated.

Figure 2:
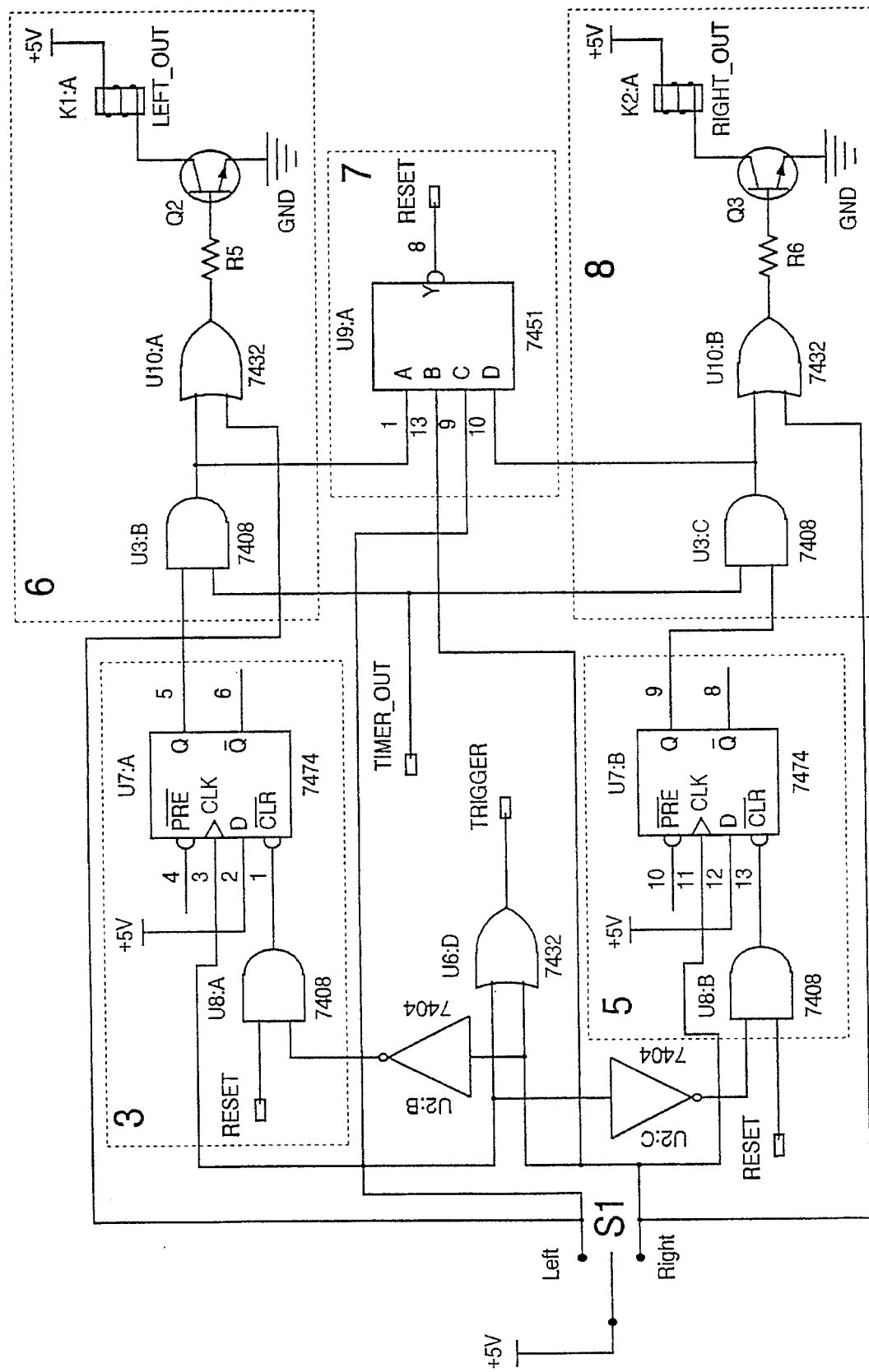
FIG. 2 is a detailed electrical schematic of the primary embodiment of the present invention, excluding the timer circuit.

The left 3 and right 5 input latches consist of identical logic circuitry represented in FIG. 2. When the switch is placed in the left position, even momentarily, the electronic latch U7:A detects the closure as a clock input and passes a logic 1 to its output Q since its input D is connected to +5V (logic 1). Likewise, when the switch is placed in the right position, electronic latch U7:B detects the closure and passes a logic 1 to its output. A switch closure in the left position which represents a logic 1 is inverted to logic 0 by U2:C which places a logic 0 on the input of AND gate U8:B. This causes a logic 0 on its output regardless of the state of its other input, thereby forcing a logic 0 to be placed on the clear input of latch U7:B clearing its output to logic 0. Likewise, a logic 1 placed on the right input is inverted by U2:B, passed through AND gate U8:A to clear the output of latch U7:A. This clearing circuitry prevents the possibility of both left and right turn indicators being on at the same time.

Figure 3:
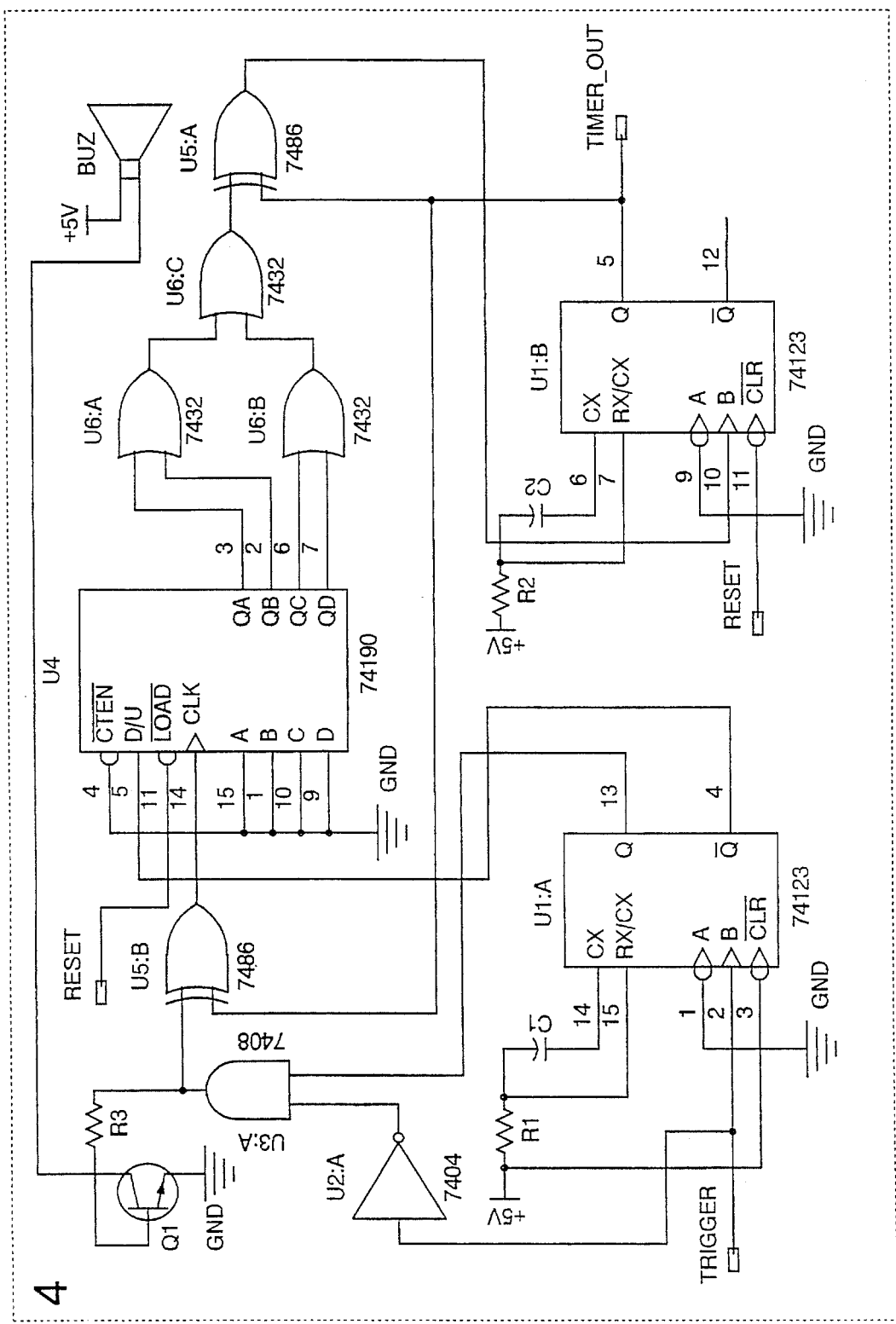
FIG. 3 is a detailed electrical schematic of the timer circuit of the primary embodiment of the present invention.

The closure of switch S1 in either the left or right position causes a logic 1 to appear on either of two inputs on OR gate U6:D. Either active input forces its output to logic 1 thereby triggering the timer circuit 4 which is depicted in FIG. 3.

When a trigger logic 1 is applied to the B input of U1:A (74123 timer chip), its output Q is driven to a logic 1 and the timer is activated. The timer duration is established by R1 and C1 according to the formula $T = 0.28 * R * C(1 + 0.7/R)$ where the value C is in picofarads, T is in nanoseconds, and R is in kilohms. The Q output of U1:A is applied to the first input of AND gate U3:A. The logic 1 on the trigger is also inverted by U2:A and applied to the second input of U3:A. If the lever switch is released, i.e., the trigger returns to logic 0, before the timer times out, logic 1's will be detected at both inputs of AND gate U3:A, thereby indicating a momentary switch closure. This will cause current to flow through R3 and transistor Q1 to drive a buzzer for an audible indication of the momentary closure. If the switch is depressed longer than the time constant of U1:A, it is deemed to be a nonmomentary closure and no further activity occurs in the timer circuit. The momentary closure detected by U3:A applies a logic 1 to the input of the XOR gate U5:B, which provides a clock pulse to the binary counter U4, providing that the output timer has not timed out at that exact instant. The logic status of the D/U input of U4 determines whether the clock input increments or decrements the current count on U4. If the clock is the result of a switch closure trigger, the Q-not output of U1:A will be logic 0, thus causing a logic 0 to be applied to the D/U input of U4 and the count will be incremented for each closure of the lever switch. Otherwise, a clock pulse on U4 must have been triggered from the output timer, and the count is decremented. The four binary outputs of U4, i.e., QA, QB, QC and QD are ORed together by U6:A, U6:B and U6:C to determine if any count is present on counter U4. The initial transition of the output of U6:C to logic 1 applies a logic 1 to the input of U5:A which forces a logic 1 to input B of output timer U1:B, thus starting its timer. The time duration of U1:B is determined by R2 and C2 according to the timer formula presented above. Output Q of U1:B is driven to a logic 1, which clocks U4 to decrement its count. This output is also connected as the second input of XOR gate U5:A such that when the U1:B output Q goes to logic 1 and a count is present on U4, the B input of U1:B is returned to logic 0. When the timer U1:B times out, its Q output goes to logic 0, which, if a count is still present on U4, will allow the output of U5:A to go to logic 1 and thus restart the output timer U1:B by applying a logic 1 to its B input. This is repeated until all counts have been decremented from U4 or until a reset is encountered.

A reset occurs when a timed output is in progress in either the left or right side, and the lever switch is closed in the other position. Reset is used to cancel a timed indication which is currently in progress. The reset logic 7 is established by U9:A. This is an AND-OR logic chip such that the output Y is logic 0 only if inputs A and B are logic 1 OR inputs C and D are logic 1. The reset logic correlates such that A represents a current left side timed output, B represents a lever switch closure to the right position, C represents a lever switch closure to the left position and D represents a current right timed output. When the output of U9:A is activated to a logic 0, counter U4, output timer U1:B and latches U7:A and U7:B are reset and their respective outputs are set to logic 0.

The signal-indicator lamps are ultimately activated by the left output driver 6 and the right output driver 8. In order for left signaling to be activated, switch S1 must remain in the left position or a left timed output must be in progress. A left timed output is achieved by both inputs of AND gate U3:B being logic 1. The inputs of U3:B correspond to the Q output of left input latch U7:A and the timer output Q of U1:B. Thus to get a left timed output, a lever-switch closure was latched by input latch U7:A and the timer circuit was activated. If either a timed or a continuous left indication is in progress, the output of U10:A is activated thus supplying current through R5 to transistor Q2. Transistor Q2 closes relay K1 which allows current to flow from the 12-volt battery through flasher 9 to indicator lamp 1.

Likewise, in order for right signaling to be activated, switch S1 must be closed in the right position or a right timed output must be in progress. A right timed output is achieved by both inputs of AND gate U3:C being logic 1. The Inputs of U3:C correspond to the Q output of right input latch U7:B and the timer output Q of U1:B. Thus to get a right timed output, a lever-switch closure was latched by input latch U7:B and the timer circuit was activated. If either a timed or continuous right indication is in progress, the output of U10:B is activated thus supplying current through R6 to transistor Q3. Transistor Q3 closes relay K2 which allows current to flow from the 12-volt battery through flasher 9 to indicator lamp 2.

The above-described embodiment represents the primary embodiment of the present invention. However, since no departure from its essential characteristics and spirit will occur if the present invention is embodied in other specific forms, it should be clear that said primary embodiment constitutes an illustration and/or a teaching; not a restriction.

The appended claims (1–14) delineate the full scope of the present invention.
In Conclusion:
The absence of timed-lever-unlatching arrangements in present-day/state-of-the-art signaling systems refutes the de facto premise of the prior art. A device that mandates simplistically timed/blanket lever unlatchings is not a viable means of reducing run-on signaling. The key to reducing run-on signaling —as the popularity of lever-on-but-unlatched signaling indicates—is to reduce the occasions that the signal lever is placed in the latched-on position. The present invention provides a more sophisticated means of reducing said occasions. The fact that it also reduces (steering-ability-impairing) lever-on-but-unlatched signaling is an additional mark of its merit.

What is claimed is:

1. An apparatus for providing momentary-activation-defined durations of motor vehicle turn signaling in a turn signal system having a means for selecting either left or right, and either momentary or latched signal activations, said apparatus comprising:

means for detecting said momentary activations of said selecting means of said turn signal system;

means for counting and maintaining a count total of said momentary activations;

means for timing successive pre-determined lengths of time, said timing means becoming operative when said count total is non-zero, said timing means decrementing said count total upon a passage of each successive pre-determined length of time;

means for detecting a right or left direction of said momentary activations;

a first switching means for conducting pulsed battery current to a right signal lamp, said first switching means conducting said pulsed current when said selecting means of said turn signal system is in a right activation position, said first switching means also conducting said pulsed current when said means for timing successive pre-determined lengths of time is operative and said direction detecting means indicates a right direction for a last momentary activation;

a second switching means for conducting pulsed battery current to a left signal lamp, said second switching means conducting said pulsed current when said selecting means of said turn signal system is in a left activation position, said second switching means also conducting said pulsed current when said means for timing successive pre-determined lengths of time is operative and said direction detecting means indicates a left direction for a last momentary activation;

means for blocking a count of a momentary activation when said timing means is operative and said means for detecting a right or left direction of said activation detects a direction different from a last direction detected;

means for deactivating said means for timing and for resetting said count total to zero when said selecting means of said turn signal system is latched or momentarily activated in a direction different from a last direction detected by said direction detecting means; and means for generating an audible signal upon each count of a momentary activation.

2. The apparatus of claim 1 further comprising means for generating a second audible signal upon each reset of said count total by said resetting means, said second audible signal distinct from said audible signal generated upon each count of a momentary activation.

3. The apparatus of claim 1 further comprising means for resetting said count total to zero when said selecting means of said turn signal system is unlatched from a latched activation, said selecting means being unlatched either manually by a vehicle operator or automatically upon completion of a vehicle turn.

4. The apparatus of claim 1 further comprising means for unlatching said means of said turn signal system from a latched activation when a non-zero count total is decremented to a zero count total by said timing means 5. The apparatus of claim 1 further comprising a visual signal indicator array, said indicator array comprising:

a plurality of right side visual indicators for indicating said count total when said detecting means detects a right direction of a last momentary activation;

a plurality of left side visual indicators for indicating said count total when said detecting means detects a left direction of a last momentary activation; and means for deactivating said right and left side visual indicators upon said count total being zero 6. The apparatus of claim 5 further comprising means for activating all of said plurality of right side visual indicators on a selection of a right latched activation of said turn signal system, and all of said plurality of left side visual indicators on a selection of a left latched activation of said turn signal system.

7. The apparatus of claim 1 wherein said means for generating an audible signal upon each count of a momentary activation further comprises means for buffering said count of momentary activations and generating an audible signal comprising a timed sequence of tones and pauses of equal duration, a number of said tones equal to said count.

8. The apparatus of claim 1 further comprising means for modifying said pre-determined lengths of time measured by said timing means.

9. The apparatus of claim 2 further comprising means for generating a third audible signal when a non-zero count total is decremented to a zero count total by said timing means or when said selecting means is unlatched from a latched activation.

* * * * *

UNITED STATES PATENT AND TRADEMARK OFFICE
CERTIFICATE OF CORRECTION

PATENT NO. : 5,486,809
DATED : January 23, 1996
INVENTOR(S) : Wadlington, Jr.

It is certified that error appears in the above-indentified patent and that said Letters Patent is hereby corrected as shown below:

Column 9, Line 10:

-- selecting -- should be inserted between "said" and "means".

Signed and Sealed this

Eighteenth Day of August, 1998

*Attest:*

*Attesting Officer*

BRUCE LEHMAN

*Commissioner of Patents and Trademarks*